United States Patent Office 2,963,693
Patented Dec. 6, 1960

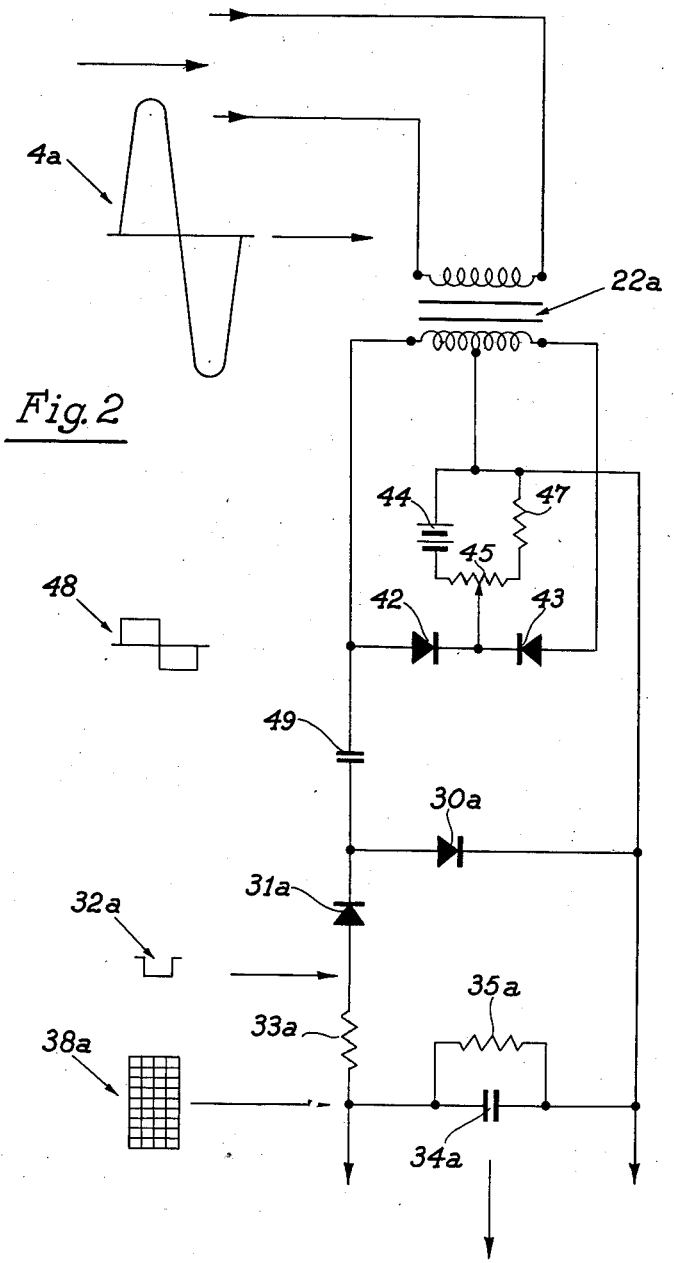

2,963,693

DEVICE FOR DETECTING AND REPEATING SELECTIVELY SOUND SIGNALS EMITTED BY OVERTAKING VEHICLES

Leonello Capalozza, Rome, Italy, assignor to Tele F'Lux Soc. a.r.l., Rome, Italy Filed Apr. 24, 1957, Ser. No. 654,926

Claims priority, application Italy May 8, 1956

9 Claims. (Cl. 340—261)

The invention relates to devices adapted to increase safety in street traffic.

The noise produced in the driver's cab of a heavy motor vehicle makes it generally impossible for the driver to hear the sound signals emitted by an overtaking vehicle until the latter has come very near and no action can be taken which would not involve a collision danger.

The average noise level inside the driver's cab in a running heavy motor vehicle is about 90 decibels or even higher, while the sound from a conventional warning horn on a motor vehicle over a distance of 40 meters very seldom exceeds an average level of 80–85 decibels, and, therefore, will be perceived by its character and not by its intensity; also, owing to the fact that the driver's attention is mainly concerned with driving, it is very unlikely that he will hear sound signals from overtaking vehicles.

A device is highly desirable, therefore, which can make the sounds from oncoming motor vehicles perceivable by the driver when said vehicles are still sufficiently far behind to enable him to take the necessary steps to render the overtaking easy at the proper moment.

To make the signal unequivocal, however, it is necessary for the device to select sound signals emitted by vehicles from street noise, even when the latter is higher than the arriving signals; the necessity then arises that the operation of the device should be caused by sound characteristics.

It has been ascertained that the maximum loudness level falls within the sound range from 50 to 1500 cycles, while nearly all motor vehicle warning horns even when emitting sounds with comparatively low fundamental frequencies, will produce harmonics of considerable intensity in the sound range of from 2000 to 8000 cycles, in which range the above mentioned street traffic noise is either not included at all or is very low. Moreover, owing to international practice and drivers' natural inclinations, the sound emitted by the warning horn on a vehicle requesting overtaking room is held for one second or longer.

Should a repeating device in the driver's cab in question not perceive sounds lasting less than one second, the aim would be attained of eliminating foreign sound pulses which would occasionally fall within the above mentioned sound range between 2000 and 8000 cycles. The apparatus would thus be made more reliable in detecting only sounds emitted by warning horns on vehicles preparing for overtaking.

In accordance with the foregoing, the overtaking warning apparatus of the present invention achieves a selection of sufficiently lasting sounds wherein the component frequencies range from 2000 to 8000 cycles, and this selection will take place with a delay of one second from the moment when the sounds have first been perceived.

The essential feature of the arrangement which will hereinafter be described resides in the manner of attaining such selection. According to this invention, the sounds collected in a motor vehicle driver's cab are converted into electric quantities, which will be formed of sine waves of different frequencies exactly corresponding to the frequencies of the sound waves making up the collected sounds. A selection of these sine-wave electric quantities is then made by reducing those of the lower frequencies, with respect to a pre-determined frequency, and enhancing those of the higher frequencies. The high-frequency sine waves are subsequently converted into square waves, and the latter are finally changed to one-direction pulses, all having the same amplitude and width. Then the arrival rate of these pulses is measured by storing them in an integrating condenser and delivering them, at the same time, through a shunt resistor cooperating with this condenser, in such a way that the difference between the integrating rate for the condenser and the rate of flow through the shunt will bring about the triggering of a repeating apparatus in the driver's cab. In other words, when an excess of the power stored in the condenser occurs, in a pre-determined period, with respect to the flow through the shunt resistor, the operation of the repeating apparatus will take place for all the time during which this excess prevails.

This invention will hereinafter be described with reference to the accompanying drawings which show the connection diagrams for two embodiments of same, and in which:

Fig. 2 is the diagram for another embodiment of the invention.

Figure 1:
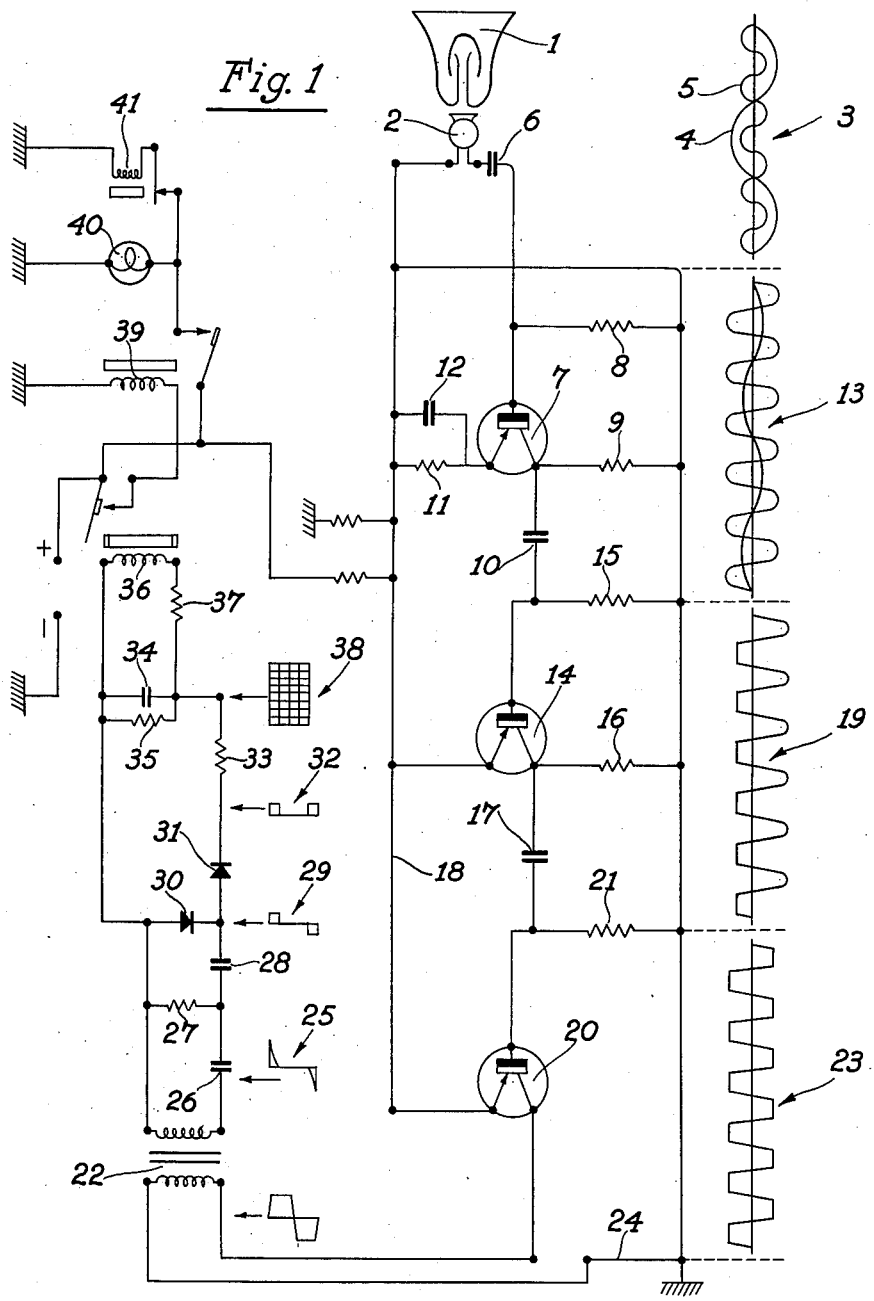
Fig. 1 is the connection diagram for one embodiment of the invention.

In the diagram of Fig. 1, a sound collector 1 concentrates the outside sounds on a microphone 2, these sounds being roughly represented by schematic Diagram 3, which shows a comparatively low-frequency fundamental note at 4 and its third harmonic at 5. Of course, there will be several higher-frequency harmonics in practice, but for the sake of simplicity the diagram has been limited to the third harmonic only, and it will be understood that what will be said hereinafter with reference to this harmonic applies also to the other harmonics, with greater reason in some instances.

Microphone 2 converts the sounds that impinge upon it into electrical information in a well known manner, which electrical information will fully and accurately reproduce the frequency, intensity and duration of sounds received; Diagram 3 will, therefore, represent also the microphone currents. In series with microphone 2 a condenser 6 is connected, acting as a filter to further the flow of the higher frequency waves in the range of sounds; these two means, together with their connecting conductors, form the first circuit of the device of the invention. A first amplifying stage follows, the principal part of which is a transistor 7, provided with a resistor 8 at its input, for the purpose of supplying a bias to the transistor to prevent this stage from introducing wave form distortions in the information received. At the transistor output, a loading resistor 9 and a coupling condenser 10 are provided, while a resistor 11 and a condenser 12 are connected to the emitter in order to stabilize the transistor. The values of the components of this stage are so chosen as to enhance the magnitude of the higher frequency waves, and accordingly the current diagram is shown at 13.

A second stage follows, whose main component likewise is a transistor 14, the input of which is connected to a resistor 15 serving to bias the transistor nearly to a cutoff extent, while the output is connected to a resistor 16 and condenser 17 the values of both of which are such as to make the enhancement of the higher frequency waves easier; the emitter is connected to a line 18. The components of this second stage are so chosen that the latter may work to limit the amplitude of negative half waves, so that the waves of all frequencies from the first stage are cut to the same amplitude; i.e. the shape of the negative half waves obtained is altered to that of a trapezium, as shown by Diagram 19.

A third stage follows, in which the main component is still a transistor 20, the input of which is connected to a biasing resistor 21 serving to limit positive half waves in connection with the fact that the current phase is reversed when passing from one stage to other. The output of transistor 20 is connected to one terminal of a transformer 22 to be described presently, and the emitter is connected to line 18. The components of this stage are so chosen that the latter will cut the positive half waves in a way quite similar to the way the second stage cuts the negative half waves. The corresponding Diagram 23, therefore, shows substantially square half waves.

The second terminal of transformer 22 is connected to line 24, to which also resistors 8, 9, 15, 16 and 21 are connected, and which is grounded. In this transformer, the bottoms of half waves will not set up an E.M.F. in the secondary winding since they are parallel to the zero line, while the sides, owing to their being very steep or even substantially vertical, will set up very short positive and negative quivers, i.e. pulses, which will be of substantially triangular shape as at 25. To the secondary winding of transformer 22 a condenser 26, a resistor 27 and a condenser 28 are T-connected, forming a differentiating unit of suitable time constant, and pulses 25 are definitely converted to a substantially rectangular shape with steep sides as shown at 29. A decay diode 30 follows, which will shunt the negative pulses, and the positive pulses, after passing a diode 31, will charge a condenser 34 through a charging rate limiting resistor 33, by adding together their instantaneous powers, all of which are now in the same direction as shown by Diagram 32. The constants for condenser 34 and resistor 33 are determined with respect to the delay to be imparted to the system in order that the latter cannot be influenced by short duration noises, i.e. by shorter noises than the shortest time assumed for signals from warning horns of overtaking vehicles. Condenser 34 is shunted by a resistor 35 tending to discharge it uninterruptedly, and also in parallel with condenser 34 there is a highly sensitive voltage responsive relay 36 having a resistor 37 in series therewith. By proportioning the inertia of this relay to the time constant of the circuit consisting of condenser 34 and resistor 35, the smallest number of pulses per second, i.e. the rate, is determined at which the pulses must arrive in order that the condenser voltage may attain the value required to close and keep closed the relay. By providing for a minimum rate of 2000 pulses per second to be operative, a selection of sounds of higher frequency than 2000 cycles per second is automatically attained, as is necessary according to what has been pointed out in the introductory paragraphs of this specification. Such addition of pulses is schematically shown by Diagram 38.

Relay 36 controls a servorelay 39 adapted to switch on a pilot lamp and/or a buzzer 41, the operation of which will transfer the signals cast by an incoming vehicle on the point of overtaking, produced by the normal warning horn on the vehicle.

A second embodiment, among the many possible embodiments of the method of this invention, is shown by the diagram in Fig. 2, and consists in that the microphone signals selected and amplified without distortion in any way in previous selecting and amplifying stages to a predetermined extent will arrive at the primary winding of a transformer 22a still in a sine-wave form as at 4a, and across the secondary winding, which has a tapping at its middle point, two opposed diodes 42 and 43 are connected. The cathodes of these two diodes are connected together, and a biasing battery 44 is connected between the tapping in the middle of the transformer secondary coil and the conductor connecting said two cathodes together. The battery circuit includes a controlling potentiometer 45 and a fixed resistance 47. The sine waves from the transformer secondary winding are converted into square waves by the two clipper diodes 42 and 43, as diagrammatically shown at 48. All of these square waves are of the same height, as determined by the value of the fixed bias voltage of battery 44.

The square waves thus obtained are fed to a decay diode 30a which will short-circuit the positive half waves and a second diode 31a is connected to diode 30a the phases being in reverse relationship, so that the negative half waves 32a may flow on. In this way one-direction pulses are obtained, all of the same height but in varying numbers during equal times, depending on the sound wave frequencies received by the microphone and amplified in the amplification stage or stages. From this point onward negative pulses 32a will add their instantaneous powers together and charge condenser 34a through resistor 33a which will slow down the condenser charging rate to eliminate all instantaneous noise falling within the range of sounds emitted by warning horns on incoming vehicles.

A resistor 35a in parallel with condenser 34a will operate in the same way as resistor 35 of the previous embodiment. From this point onward the arrangement is the same as that of the embodiment set forth above with reference to Fig. 1, and pulses will be added together as schematically shown by Diagram 38a quite similar to Diagram 38 in Fig. 1.

It will be understood that the device as disclosed hereinbefore and illustrated by the accompanying drawings by way of example in respect of two embodiments thereof is capable of a large variety of different embodiments, since many component parts can be changed, added or omitted therein without departing from the scope of the invention, provided that the basic features forming the subject matter of the same are unaltered, these features being defined in the appended claims.

What is claimed is:

1. Apparatus for indicating the presence of particular sound waves comprising means for converting the sound waves into electrical signals in the form of sine waves having frequencies corresponding to the frequencies of the sound waves, means for selecting electrical signals having frequencies greater than a predetermined frequency, shaping means shaping the selected electrical signals into square waves, rectifier means for converting the square waves to unidirectional pulses, an integrating condenser for storing said unidirection pulses as a charge, a shunt resistor for discharging said integrating condenser, and an alarm device responsive to said integrating condenser, said alarm device being activated when a predetermined quantity of charge is stored on said condenser, said shaping means including a transformer having a primary winding and a center tapped secondary winding, two clipping diodes serially connected across said secondary winding with their cathodes connected together, a biasing battery connected between said center tap and the junction of said cathodes, and potentiometer means operatively associated with said biasing battery in such a way that the sine waves from said secondary winding are converted by said clipping diodes to square waves all having the same amplitude according to the value of voltage of said biasing battery.

2. Apparatus for giving an alarm when a particular sound is present among a plurality of sounds, a microphone for converting sounds received into sinusoidal electric quantities having the same frequency, intensity and duration as the sound waves, means responsive to said microphone for amplifying the higher frequency sinusoidal electrical quantities with respect to a predetermined frequency, means for forming substantially square waves from the sinusoidal electrical quantities, differentiating means for forming pulses of alternating polarity from said square waves, rectifier means for selecting pulses of one polarity, a condenser responsive to said rectifier means, said condenser being charged by said selected pulses, a first resistor interposed between said rectifier means and said condenser for slowing down the rate of charge, a second resistor shunting said condenser for constantly discharging said condenser, a relay connected in parallel with said condenser, and an alarm means responsive to said relay.

3. The apparatus according to claim 2 wherein the inertia of said relay is proportioned to the time constant of said condenser and said second resistor in such a way as to fix the rate at which said pulses must arrive at said condenser in order that the voltage may reach the value required to close and keep closed said relay.

4. Apparatus for indicating the presence of signals having sinusoidal waveforms for a predetermined period of time comprising shaping means shaping said signals having sinusoidal waveforms into signals having square waveforms with portions equally distributed on either side of an average value, unidirectional transmission means for transmitting those portions of the signals on one side of said average value, integrating means for accumulating the transmitted signals, discharging means associated with said integrating means for removing the accumulated signals at a predetermined rate, and indicating means responsive to said integrating means, said indicating means being activated when the accumulated signals exceed a predetermined amount said apparatus further including a pulse forming means interposed between said shaping means and said unidirectional transmission means to form pulses at the transitions of said square waveforms.

5. Apparatus for indicating the presence of signals having sinusoidal waveforms for a predetermined period of time comprising shaping means shaping said signals having sinusoidal waveforms into signals having square waveforms with portions equally distributed on either side of an average value, unidirectional transmission means for transmitting those portions of the signals on one side of said average value, integrating means for accumulating the transmitted signals, discharging means associated with said intergrating means for removing the accumulated signals at a predetermined rate, and indicating means responsive to said integrating means, said indicating means being activated when the accumulated signals exceed a predetermined amount, said shaping means including first and second cascaded transistors biased to clip the peaks of said sinusoidal waveforms.

6. Apparatus for indicating the presence of signals having sinusoidal waveforms for a predetermined period of time comprising shaping means shaping said signals having sinusoidal waveforms into signals having square waveforms with portions equally distributed on either side of an average value, unidirectional transmission means for transmitting those portions of the signals on one side of said average value, integrating means for accumulating the transmitted signals, discharging means associated with said integrating means for removing the accumulated signals at a predetermined rate, and indicating means responsive to said integrating means, said indicating means being activated when the accumulated signals exceed a predetermined amount, said shaping means including a transformer having a centertapped secondary winding, a pair of diodes serially disposed across said secondary winding with like elements connected at a junction, a biasing means coupled between the centertap of said secondary winding and said junction, and means for coupling one end of said secondary winding to said unidirectional transmission means.

7. Apparatus for indicating the presence of signals having sinusoidal waveforms for a predetermined period of time comprising shaping means shaping said signals having sinusoidal waveforms into signals having square waveforms with portions equally distributed on either side of an average value, unidirectional transmission means for transmitting those portions of the signals on one side of said average value, integrating means for accumulating the transmitted signals, discharging means associated with said integrating means for removing the accumulated signals at a predetermined rate, and indicating means responsive to said integrating means, said indicating means being activated when the accumulated signals exceed a predetermined amount, said integrating means including a first resistor connecting said unidirectional transmission means and said indicating means, and a condenser coupled in shunt across said indicating means.

8. The apparatus of claim 7 wherein said discharging means is a second resistor in parallel with said condenser.

9. The apparatus of claim 8 wherein said indicating means is a relay having a time of operation greater than the time constant of said condenser and said second resistor.

References Cited in the file of this patent

UNITED STATES PATENTS

| | | |
|---|---|---|
| 2,077,552 | Findley | Apr. 20, 1937 |
| 2,176,742 | LaPierre | Oct. 17, 1939 |
| 2,545,218 | Weber | Mar. 13, 1951 |
| 2,578,347 | Gagnaire | Dec. 11, 1951 |

FOREIGN PATENTS

| | | |
|---|---|---|
| 432,865 | Great Britain | Apr. 30, 1934 |
| 828,493 | France | May 18, 1938 |
| 494,659 | Belgium | July 17, 1950 |